US012576395B2

(12) United States Patent
Aleksei et al.

(10) Patent No.: US 12,576,395 B2
(45) Date of Patent: Mar. 17, 2026

(54) EMISSION CONTROL CATALYST ARTICLE WITH PGM-GRADIENT ARCHITECTURE

(71) Applicant: BASF MOBILE EMISSIONS CATALYSTS LLC, Iselin, NJ (US)

(72) Inventors: Vjunov Aleksei, Iselin, NJ (US); Sun Yipeng, Iselin, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 737 days.

(21) Appl. No.: 17/907,563

(22) PCT Filed: Apr. 15, 2021

(86) PCT No.: PCT/EP2021/059745
§ 371 (c)(1),
(2) Date: Sep. 28, 2022

(87) PCT Pub. No.: WO2021/209537
PCT Pub. Date: Oct. 21, 2021

(65) Prior Publication Data
US 2023/0147850 A1 May 11, 2023

Related U.S. Application Data

(60) Provisional application No. 63/010,163, filed on Apr. 15, 2020.

(51) Int. Cl.
| | |
|---|---|
| *B01J 23/46* | (2006.01) |
| *B01D 53/94* | (2006.01) |
| *B01J 23/02* | (2006.01) |
| *B01J 23/10* | (2006.01) |
| *B01J 35/00* | (2024.01) |
| *B01J 35/04* | (2006.01) |
| *F01N 3/28* | (2006.01) |
| *B01J 35/56* | (2024.01) |
| *F01N 3/10* | (2006.01) |

(52) U.S. Cl.
CPC .......... *B01J 23/464* (2013.01); *B01D 53/945* (2013.01); *B01D 53/9472* (2013.01); *B01J 23/02* (2013.01); *B01J 23/10* (2013.01); *B01J 35/19* (2024.01); *F01N 3/2803* (2013.01); *F01N 3/2828* (2013.01); *B01D 2255/1021* (2013.01); *B01D 2255/1023* (2013.01); *B01D*
*2255/1025* (2013.01); *B01D 2255/9022* (2013.01); *B01D 2255/9032* (2013.01); *B01D 2255/908* (2013.01); *B01J 35/56* (2024.01); *F01N 3/101* (2013.01); *F01N 2370/02* (2013.01)

(58) Field of Classification Search
CPC . B01J 23/464; B01J 23/02; B01J 23/10; B01J 35/19; B01D 53/945; B01D 53/9472; F01N 3/2803; F01N 3/2828
See application file for complete search history.

(56) References Cited

U.S. PATENT DOCUMENTS

2015/0174564 A1* 6/2015 Muller-Stach ....... B01J 37/0244
422/171

FOREIGN PATENT DOCUMENTS

| | | | | |
|---|---|---|---|---|
| EP | 3632537 A1 * | 4/2020 | ............. | B01D 53/94 |
| WO | WO-2016210221 A1 | 12/2016 | | |
| WO | WO-2021102391 A1 | 5/2021 | | |

OTHER PUBLICATIONS

R.M. Heck et al., "The Preparation of Catalytic Materials: Carriers, Active Components and Monolithic Substrates," Catalytic Air Pollution Control: Commercial Technology, Second Edition, pp. 18 and 19, Jul. 24, 2002.
International Search Report dated Jun. 22 2021, PCT/EP2021/059745.

* cited by examiner

*Primary Examiner* — Yong L Chu
(74) *Attorney, Agent, or Firm* — DLA Piper LLP (US)

(57) ABSTRACT

The presently invention provides an emission control catalyst article comprising a substrate, a bottom washcoat layer comprising a platinum group metal coated on the 60 to 100% length of the substrate, and a top washcoat layer comprising a platinum group metal coated on the 60 to 100% length of the substrate such that the top coat covers at least 60% of the length of the bottom washcoat layer, wherein at least a portion of the top washcoat layer, the bottom washcoat layer or both washcoat layers comprises a platinum group metal deposited within the said washcoat layer(s) with a platinum group metal gradient such that the PGM concentration in a top-most portion of the said washcoat layer is at least two time higher compared to the PGM concentration in a bottom-most portion of the said washcoat layer.

19 Claims, 6 Drawing Sheets

—— Catalyst A    ········ Catalyst B    — — Catalyst C    —·— Catalyst D    —·· Catalyst E

EMISSION CONTROL CATALYST ARTICLE WITH PGM-GRADIENT ARCHITECTURE

This application is a national stage filing under 35 U.S.C. § 371 of International Application No. PCT/EP2021/059745, filed on Apr. 15, 2021, and claims priority to U.S. Provisional Application No. 63/010,163, filed Apr. 15, 2020; the disclosure of each of these applications are incorporated herein by reference in their entirety.

FIELD OF THE INVENTION

The presently claimed invention relates to an emission control catalyst article useful for the treatment of the exhaust gases to reduce contaminants contained therein. Particularly, the presently claimed invention relates to the emission control catalyst article wherein a portion or all of the platinum group metal is deposited such that concentration gradients are created within and/or between washcoat layers and a method of preparing the said catalyst article.

BACKGROUND OF THE INVENTION

Three-way conversion (TWC) catalysts (hereinafter interchangeably referred to as three-way conversion catalyst, three-way catalyst, TWC Catalyst, and TWC) have been utilized in the treatment of the exhaust gas streams from the internal combustion engines for several years. Generally, in order to treat or purify the exhaust gas containing pollutants such as hydrocarbons, nitrogen oxides, and carbon monoxide, catalytic converters containing a three-way conversion catalyst are used in the exhaust gas line of an internal combustion engine. The three-way conversion catalyst is typically known to oxidize unburnt hydrocarbon and carbon monoxide and reduce nitrogen oxides. Most of the commercially available TWC catalysts contain palladium as a major platinum group metal component which is used along with a lesser amount of rhodium.

The catalyst is formed by coating the PGM metal containing slurry on a substrate and the coated layer may be in the form of a layered structure having a bottom layer and a top layer. The platinum group metals are coated on the substrate uniformly with a PGM loading ranging from 3 to 300 g/ft$^3$. In another technique, the platinum group metals are coated on the substrate in a zoned manner.

However, it is found that the existing catalysts are still required to be improved in terms of the washcoat architecture, PGM type and loading amount as well as coating strategy and method in order to achieve higher reduction of pollutants such as NO$_x$, HC and CO.

Accordingly, it is envisaged to prepare catalysts containing a PGM gradient within the washcoat layer or layers covering 20-100% of the catalyst substrate length such that the PGM concentration decreases from the top-most portion of the layer to the bottom-most portion of the layer and at least 20-80% of a given PGM type within the washcoat layer containing a PGM gradient is contained within the upper-most ⅓ of the said washcoat layer in order to achieve the improved reduction of pollutants such as NO$_x$, HC and CO.

SUMMARY OF THE INVENTION

Accordingly, the present invention provides an emission control catalyst article comprising: a substrate having a first inlet axial end and a second outlet axial end, a bottom washcoat layer comprising a platinum group metal coated on the 60 to 100% length of the substrate from the first axial end to the second axial end, and a top washcoat layer comprising a platinum group metal coated on the 60 to 100% length of the substrate from either the first axial or the second axial end of the substrate such that the top coat covers at least 60% of the length of the bottom washcoat layer, wherein at least a portion of the top washcoat layer, the bottom washcoat layer or both washcoat layers comprises a platinum group metal deposited within the said washcoat layer(s) with a platinum group metal gradient such that the PGM concentration in a top-most portion of the said washcoat layer is at least two time higher compared to the PGM concentration in a bottom-most portion of the said washcoat layer, wherein the length of the portion of the top washcoat layer, the bottom washcoat layer or both washcoat layers ranges from 20-100% of the substrate length.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only and should not be construed as limiting the invention. The above and other features of the presently claimed invention, their nature, and various advantages will become more apparent upon consideration of the following detailed description, taken in conjunction with the accompanying drawings:

DETAILED DESCRIPTION

Figure 1:
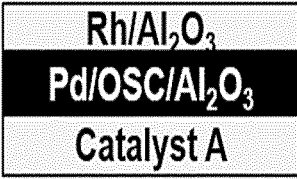
FIG. 1 is a schematic representation of catalyst article designs in exemplary configurations according to some embodiments of the presently claimed invention.
Figure 1:
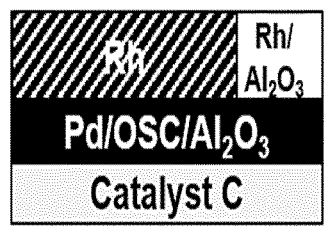
Figure 1:
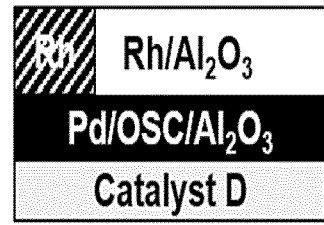
Figure 1:
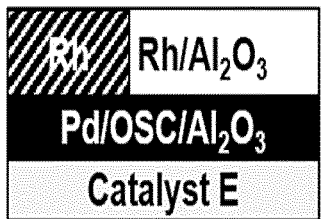

The presently claimed invention now will be described more fully hereafter. The presently claimed invention may be embodied in many different forms and should not be construed as limited to the embodiments set forth herein; rather, these embodiments are provided so that this presently claimed invention will be thorough and complete, and will fully convey the scope of the invention to those skilled in the art. No language in the specification should be construed as indicating any non-claimed element as essential to the practice of the disclosed materials and methods.

The use of the terms "a", "an", "the", and similar referents in the context of describing the materials and methods discussed herein (especially in the context of the following claims) are to be construed to cover both the singular and the plural, unless otherwise indicated herein or clearly contradicted by context.

The term "about" used throughout this specification is used to describe and account for small fluctuations. For example, the term "about" refers to less than or equal to ±5%, such as less than or equal to ±2%, less than or equal to 1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

All methods described herein can be performed in any suitable order unless otherwise indicated herein or otherwise clearly contradicted by context. The use of any and all examples, or exemplary language (e.g., "such as") provided herein, is intended merely to better illustrate the materials and methods and does not pose a limitation on the scope unless otherwise claimed.

The platinum group metal (PGM) refers to any component that includes a PGM (Rh, Pd, and Pt). For example, the PGM may be in a metallic form, with zero valence, or the PGM may be in an oxide form. Reference to "PGM component" allows for the presence of the PGM in any valence state. The terms "platinum (Pt) component," "rhodium (Rh) component," "palladium (Pd) component," and the like refer to the respective platinum group metal compound, complex, or the like which, upon calcination or use of the catalyst, decomposes or otherwise converts to a catalytically active form, usually the metal or the metal oxide.

As used herein, the term "catalyst" or "catalyst composition" refers to a material that promotes a reaction.

The term "catalytic article" or "catalyst article" or "catalyst" refers to a component in which a substrate is coated with catalyst composition which is used to promote a desired reaction. In one embodiment, the catalytic article is a layered catalytic article. The term layered catalytic article refers to a catalytic article in which a substrate is coated with a PGM composition(s) in a layered fashion. These composition(s) may be referred to as washcoat(s).

The term "$NO_x$" refers to nitrogen oxide compounds, such as NO and/or $NO_2$.

The term "PGM-GRADIENT" refers to a controlled and systematic difference in PGM concentration within the washcoat layer with typically higher PGM concentration in the upper portion of a said layer compared to the lower portion of the same layer. The term "rhodium gradient" refers to a controlled and systematic difference in rhodium concentration within the washcoat layer with typically higher rhodium concentration in the upper portion of a said layer compared to the lower portion of the same layer.

In one aspect, the presently claimed invention provides an emission control catalyst article comprising: a substrate having a first inlet axial end and a second outlet axial end, a bottom washcoat layer comprising a platinum group metal coated on the 60 to 100% length of the substrate from the first axial end to the second axial end, and a top washcoat layer comprising a platinum group metal coated on the 60 to 100% length of the substrate from either the first axial or the second axial end of the substrate such that the top coat covers at least 60% of the length of the bottom washcoat layer, wherein at least a portion of the top washcoat layer, the bottom washcoat layer or both washcoat layers comprises a platinum group metal deposited within the said washcoat layer(s) with a platinum group metal gradient such that the PGM concentration in a top-most portion of the said washcoat layer is at least two times higher compared to the PGM concentration in a bottom-most portion of the said washcoat layer, wherein the length of the portion of the top washcoat layer, the bottom washcoat layer or both washcoat layers ranges from 20-100% of the substrate length.

The particular features, structures, materials, or characteristics may be combined in any suitable manner in one or more embodiments. Various embodiments are listed below. It will be understood that the embodiments listed below may be combined with all aspects and other embodiments in accordance with the scope of the invention.

In one embodiment, the total platinum group metal loading deposited with a gradient is 30 to 95% of the total platinum group metal loading present in the said washcoat layer wherein the ratio of the total amount of platinum group metal deposited uniformly within a washcoat compared to the platinum group metal amount deposited by gradient ranges from 10:1 and 1:10.

In one embodiment, there is provided an emission control catalyst article comprising: a substrate having a first inlet axial end and a second outlet axial end, a bottom washcoat layer comprising a platinum group metal coated on the 60 to 100% length of the substrate from the first axial end to the second axial end, and a top washcoat layer comprising a platinum group metal coated on the 60 to 100% length of the substrate from either the first axial or the second axial end of the substrate such that the top coat covers at least 60% of the length of the bottom washcoat layer, wherein at least a portion of the top washcoat layer, the bottom washcoat layer or both washcoat layers comprises a platinum group metal deposited within the said washcoat layer(s) with a platinum group metal gradient such that 50% or more of the platinum group metal within a top washcoat layer or bottom washcoat layer is deposited in the uppermost ⅓ of the washcoat layer, as determined by an electron-probe microanalysis (EPMA) line scan from an uppermost layer of the washcoat layer containing the platinum group metal gradient to the substrate, wherein the length of the portion of the top washcoat layer, the bottom washcoat layer or both washcoat layers ranges from 20-100% of the substrate length.

In one embodiment, there is provided an emission control catalyst article comprising: a substrate having a first inlet axial end and a second outlet axial end, a bottom washcoat layer comprising a platinum group metal coated on the 60 to 100% length of the substrate from the first axial end to the second axial end, and a top washcoat layer comprising a platinum group metal coated on the 60 to 100% length of the substrate from either the first axial or the second axial end of the substrate such that the top coat covers at least 60% of the length of the bottom washcoat layer, wherein at least a portion of the top washcoat layer, the bottom washcoat layer or both washcoat layers comprises a platinum group metal deposited within the said washcoat layer(s) with a platinum group metal gradient such that the PGM concentration in a top-most portion of the said washcoat layer is at least two times higher compared to the PGM concentration in a bottom-most portion of the said washcoat layer, wherein the length of the portion of the top washcoat layer, the bottom washcoat layer or both washcoat layers ranges from 20-100% of the substrate length, wherein the total platinum group metal loading deposited with a gradient is 30 to 95% of the total platinum group metal loading present in the said washcoat layer, wherein the ratio of the total amount of platinum group metal deposited uniformly within a washcoat compared to the platinum group metal amount deposited by gradient ranges from 10:1 and 1:10.

In one embodiment, there is provided an emission control catalyst article comprising: a substrate having a first inlet axial end and a second outlet axial end, a bottom washcoat layer comprising a platinum group metal coated on the 60 to 100% length of the substrate from the first axial end to the second axial end, and a top washcoat layer comprising a platinum group metal coated on the 60 to 100% length of the substrate from either the first axial or the second axial end of the substrate such that the top coat covers at least 60% of the length of the bottom washcoat layer, wherein at least a portion of the top washcoat layer, the bottom washcoat layer or both washcoat layers comprises a platinum group metal deposited within the said washcoat layer(s) with a platinum group metal gradient such that 50% or more of the platinum group metal within a top washcoat layer or bottom washcoat layer is deposited in the uppermost ⅓ of the washcoat layer, as determined by an electron-probe microanalysis (EPMA) line scan from an uppermost layer of the washcoat layer containing the platinum group metal gradient to the substrate, wherein the length of the portion of the top washcoat layer, the bottom washcoat layer or both washcoat layers ranges from 20-100% of the substrate length, wherein the total platinum group metal loading deposited with a gradient is 30 to 95% of the total platinum group metal loading present in the said washcoat layer, wherein the ratio of the total amount of platinum group metal deposited uniformly within a washcoat compared to the platinum group metal amount deposited by gradient ranges from 10:1 and 1:10.

In one embodiment, the length of the platinum group metal gradient is ranging from 1.2 inch to 8 inch.

In one exemplary embodiment, there is provided an emission control catalyst article comprising: a substrate having a first inlet axial end and a second outlet axial end, a bottom washcoat layer comprising a platinum group metal coated on the 60 to 100% length of the substrate from the first axial end to the second axial end, and a top washcoat layer comprising a platinum group metal coated on the 60 to 100% length of the substrate from either the first axial or the second axial end of the substrate such that the top coat covers at least 60% of the length of the bottom washcoat layer, wherein at least a portion of the top washcoat layer comprises rhodium or mixture of rhodium and platinum group metal(s) deposited within the said washcoat layer(s) with a rhodium gradient such that the rhodium concentration in a top-most portion of the said washcoat layer is at least two times higher compared to the rhodium concentration in a bottom-most portion of the said washcoat layer, wherein the length of the portion of the top washcoat layer, the bottom washcoat layer or both washcoat layers ranges from 20-100% of the substrate length, wherein the total platinum group metal loading deposited with a gradient is 30 to 95% of the total platinum group metal loading present in the said washcoat layer, wherein the ratio of the total amount of rhodium deposited uniformly within a washcoat compared to the rhodium amount deposited by gradient ranges from 10:1 and 1:10.

In one exemplary embodiment, there is provided an emission control catalyst article comprising: a substrate having a first inlet axial end and a second outlet axial end, a bottom washcoat layer comprising a platinum group metal coated on the 60 to 100% length of the substrate from the first axial end to the second axial end, and a top washcoat layer comprising a platinum group metal coated on the 60 to 100% length of the substrate from either the first axial or the second axial end of the substrate such that the top coat covers at least 60% of the length of the bottom washcoat layer, wherein at least a portion of the top washcoat layer comprises rhodium or mixture of rhodium and platinum group metal(s) deposited within the said washcoat layer(s) with a rhodium gradient such that 50% or more of the rhodium within a top washcoat layer or bottom washcoat layer is deposited in the uppermost ⅓ of the washcoat layer, as determined by an electron-probe microanalysis (EPMA) line scan from an uppermost layer of the washcoat layer containing the rhodium gradient to the substrate, wherein the length of the portion of the top washcoat layer, the bottom washcoat layer or both washcoat layers ranges from 20-100% of the substrate length, wherein the total platinum group metal loading deposited with a gradient is 30 to 95% of the total platinum group metal loading present in the said washcoat layer, wherein the ratio of the total amount of rhodium deposited uniformly within a washcoat compared to the rhodium amount deposited by gradient ranges from 10:1 and 1:10.

In one embodiment, the length of the rhodium gradient is ranging from 1.2 inch to 8 inch.

The platinum group metal gradient is formed by coating a portion of the top washcoat layer and/or the bottom washcoat layer, which is pre-loaded with platinum group metal, with an additional platinum group metal solution. In another embodiment, the platinum group metal gradient is formed by coating a portion of the top washcoat layer and/or the bottom washcoat layer, which is essentially free of any platinum group metal, with a platinum group metal solution. The platinum group metal is selected from platinum, palladium, rhodium and a combination thereof.

The platinum group metal is supported on a support selected from oxygen storage component, alumina component, ceria component, zirconia component and a combination thereof. The alumina component comprises alumina, lanthana-alumina, ceria-alumina, ceria-zirconia-alumina, zirconia-alumina, lanthana-zirconia-alumina, baria-alumina, baria-lanthana-alumina, baria-lanthana-neodymia-alumina, or combinations thereof. The oxygen storage component comprises ceria-zirconia, ceria-zirconia-lanthana, ceria-zirconia-yttria, ceria-zirconia-lanthana-yttria, ceria-zirconia-neodymia, ceria-zirconia-praseodymia, ceria-zirconia-lanthana-neodymia, ceria-zirconia-lanthana-praseodymia, ceria-zirconia-lanthana-neodymia-praseodymia, or any combination thereof. The zirconia component comprises lanthana-zirconia, and barium-zirconia.

In one embodiment, at least 60% of rhodium is deposited with a gradient such that it covers at least 50% of the substrate length and the Rh concentration is two times higher in the uppermost portion of the washcoat layer compared to the lowermost portion of the washcoat layer. In one embodiment, 50% or more of the platinum group metal within a top washcoat layer or bottom washcoat layer is deposited in the uppermost/of the washcoat layer, as determined by an electron-probe microanalysis (EPMA) line scan from an uppermost layer of the washcoat layer containing the platinum group metal gradient to the substrate. In one embodiment, 55% to 95% of the platinum group metal within a top washcoat layer or bottom washcoat layer is deposited in the uppermost ⅓ of the washcoat layer, as determined by an electron-probe microanalysis (EPMA) line scan from an uppermost layer of the washcoat layer containing the platinum group metal gradient to the substrate. In one exemplary embodiment, the platinum group metal gradient comprises palladium.

In another exemplary embodiment, the platinum group metal gradient comprises platinum. In still another exemplary embodiment, the platinum group metal gradient comprises rhodium.

In one embodiment, the bottom washcoat layer comprises at least one alkaline earth metal oxide comprising barium oxide, strontium oxide, or any combination thereof, in an amount of 1.0 to 20 wt. %, based on the total weight of the bottom washcoat.

In one embodiment, the substrate is a ceramic substrate, metal substrate, ceramic foam substrate, polymer foam substrate or a woven fibre substrate. In one embodiment, the substrate is monolithic or honeycomb substrate.

Reference to "monolithic substrate" or "honeycomb substrate" means a unitary structure that is homogeneous and continuous from inlet to outlet.

According to one or more embodiments, the substrate of the catalytic article of the presently claimed invention may be constructed of any material typically used for preparing automotive catalysts and typically comprises a ceramic or a metal monolithic honeycomb structure.

The substrate typically provides a plurality of wall surfaces upon which washcoats comprising the catalyst compositions described herein above are applied and adhered, thereby acting as a carrier for the catalyst compositions.

Exemplary metallic substrates include heat resistant metals and metal alloys such as titanium and stainless steel as well as other alloys in which iron is a substantial or major component. Such alloys may contain one or more nickel, chromium, and/or aluminium, and the total amount of these metals may advantageously comprise at least 15 wt. % of the alloy. e.g. 10-25 wt. % of chromium, 3-8% of aluminium, and up to 20 wt. % of nickel. The alloys may also contain small or trace amounts of one or more metals such as manganese, copper, vanadium, titanium and the like. The surface of the metal substrate may be oxidized at high temperature, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-alumina, silicon nitride, zircon mullite, spodumene, alumina-silica magnesia, zircon silicate, sillimanite, magnesium silicates, zircon, petalite, alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which are of any suitable cross-sectional shape, such as trapezoidal, rectangular, square, sinusoidal, hexagonal, oval, circular, and the like. Such structures contain from about 60 to about 1200 or more gas inlet openings (i.e., "cells") per square inch of cross section (cpsi), more usually from about 300 to 900 cpsi. The wall thickness of flow-through substrates can vary, with a typical range being between 0.002 and 0.1 inches. A representative commercially available flow-through substrate is a cordierite substrate having 400 cpsi and a wall thickness of 6 mil, or 600 cpsi and a wall thickness of 4.0 mil. However, it will be understood that the invention is not limited to a particular substrate type, material, or geometry. In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used as wall-flow filter substrates. However, it will be understood that the invention is not limited to a particular substrate type, material, or geometry. Note that where the substrate is a wall-flow substrate, the catalyst composition can permeate into the pore structure of the porous walls (i.e., partially or fully occluding the pore openings) in addition to being disposed on the surface of the walls. In one embodiment, the substrate has a flow through ceramic honeycomb structure, a wall-flow ceramic honeycomb structure, or a metal honeycomb structure.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. A washcoat is formed by preparing a slurry containing a certain solid content (e.g., 15-60% by weight) of particles in a liquid vehicle, which is then coated onto a substrate and dried to provide a washcoat layer.

As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. In one embodiment, a substrate contains one or more washcoat layers, and each washcoat layer is different in some way (e.g., may differ in physical properties thereof such as, for example particle size or crystallite phase) and/or may differ in the chemical catalytic functions.

The catalyst article may be "fresh" meaning it is new and has not been exposed to any heat or thermal stress for a prolonged period of time. "Fresh" may also mean that the catalyst was recently prepared and has not been exposed to any exhaust gases or elevated temperatures. Likewise, an "aged" catalyst article is not fresh and has been exposed to exhaust gases and elevated temperatures (i.e., greater than 500° C.) for a prolonged period of time (i.e., greater than 3 hours).

As used herein, the term "stream" broadly refers to any combination of flowing gas that may contain solid or liquid particulate matter.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

Figure 4A:
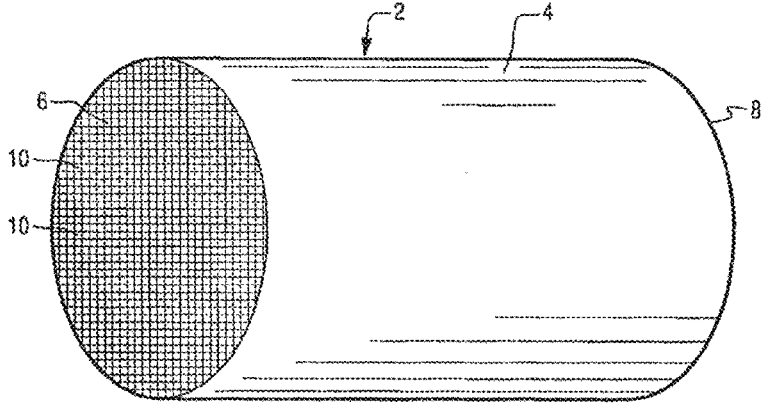
FIG. 4A is a perspective view of a honeycomb-type substrate carrier which may comprise the catalyst composition in accordance with one embodiment of the presently claimed invention.
Figure 4B:
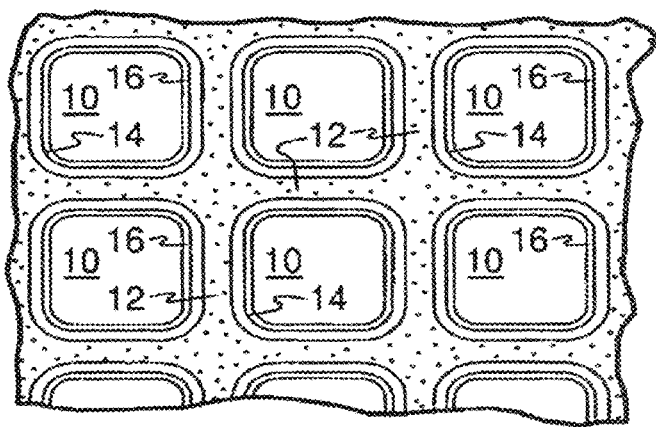
FIG. 4B is a partial cross-section view enlarged relative to FIG. 4A and taken along a plane parallel to the end faces of the substrate carrier of FIG. 4A, which shows an enlarged view of a plurality of gas flow passages shown in FIG. 4A.

FIGS. 4A and 4B illustrate an exemplary substrate 2 in the form of a flow-through substrate coated with washcoat compositions as described herein. Referring to FIG. 4A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 4B, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As more easily seen in FIG. 5, walls 12 are so dimensioned and configured that gas flow passages 10 have a substantially regular polygonal shape. As shown, the washcoat compositions can be applied in multiple, distinct layers if desired. In the illustrated embodiment, the washcoats consist of a discrete first washcoat layer 14 adhered to the walls 12 of the substrate member and a second discrete washcoat layer 16 coated over the first washcoat layer 14. In one embodiment, the presently claimed invention is also practiced with two or more (e.g., 3, or 4) washcoat layers and is not limited to the illustrated two-layer embodiment.

Figure 5:
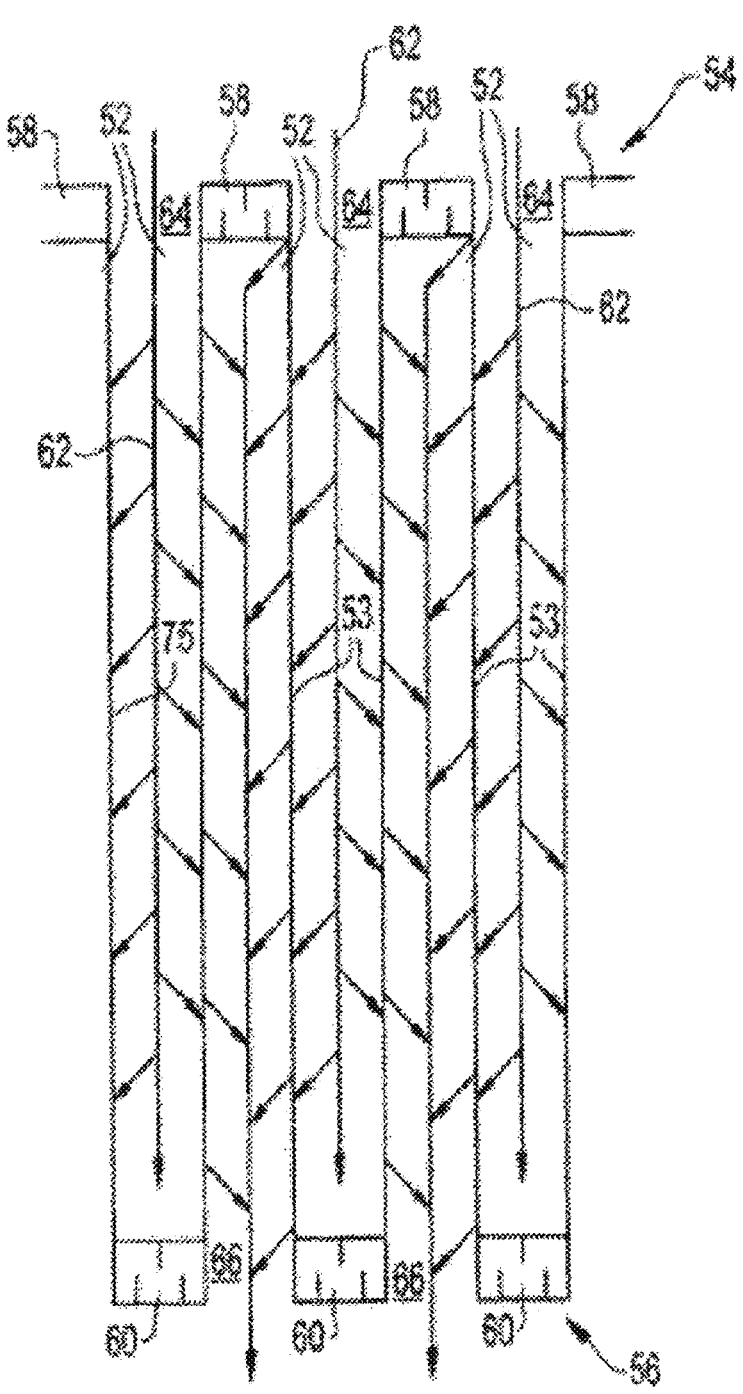
FIG. 5 is a cutaway view of a section enlarged relative to FIG. 4A, wherein the honeycomb-type substrate in FIG. 4A represents a wall flow filter substrate monolith.

FIG. 5 illustrates an exemplary substrate 2 in the form of a wall flow filter substrate coated with a washcoat composition as described herein. As seen in FIG. 5, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58 and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalysed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic material on the inlet and/or outlet walls of the element.

In another aspect, there is also provided a process for the preparation of an emission control catalyst article.

In one embodiment, the process involves providing a substrate having a first inlet axial end and a second outlet axial end, coating a bottom washcoat layer comprising a platinum group metal on the 60 to 100% length of the substrate from the first axial end to the second axial end, and coating a top washcoat layer comprising a platinum group metal on the 60 to 100% length of the substrate from either the first axial or the second axial end of the substrate such that the top coat covers at least 60% of the length of the bottom washcoat layer, wherein at least a portion of the top washcoat layer, the bottom washcoat layer or both washcoat layers comprises a platinum group metal deposited within the said washcoat layer(s) with a platinum group metal gradient such that the PGM concentration in a top-most portion of the said washcoat layer is at least two times higher compared to the PGM concentration in a bottom-most portion of the said washcoat layer, wherein the length of the portion of the top washcoat layer, the bottom washcoat layer or both washcoat layers ranges from 20-100% of the substrate length.

In one embodiment, the process involves providing a substrate having a first inlet axial end and a second outlet axial end, coating a bottom washcoat layer comprising a platinum group metal coated on the 60 to 100% length of the substrate from the first axial end to the second axial end, and coating a top washcoat layer comprising a platinum group metal coated on the 60 to 100% length of the substrate from either the first axial or the second axial end of the substrate such that the top coat covers at least 60% of the length of the bottom washcoat layer, wherein at least a portion of the top washcoat layer comprises rhodium or a mixture of rhodium and platinum group metal(s) deposited within the said washcoat layer(s) with a rhodium gradient such that the rhodium concentration in a top-most portion of the said washcoat layer is at least two times higher compared to the rhodium concentration in a bottom-most portion of the said washcoat layer, wherein the length of the portion of the top washcoat layer, the bottom washcoat layer or both washcoat layers ranges from 20-100% of the substrate length, wherein the total platinum group metal loading deposited with a gradient is 30 to 95% of the total platinum group metal loading present in the said washcoat layer, wherein the ratio of the total amount of rhodium deposited uniformly within a washcoat compared to the rhodium amount deposited by gradient ranges from 10:1 and 1:10.

In one embodiment, the preparation of an emission control catalyst article involves a) preparation of a bottom washcoat layer coated on the 60 to 100% length of the substrate from the inlet axial end to the outlet axial end which comprises obtaining a slurry comprising platinum group metal impregnated onto at least one support and coating said slurry on the total length of the substrate; b) preparation of a top washcoat coated on the 60 to 100% length of the substrate from either the inlet axial end or the outlet axial end of the substrate such that the top coat covers at least 60% of the length of the bottom washcoat layer, which comprises obtaining a slurry comprising platinum group metal(s) impregnated onto a support and coating the slurry over at least 60% length of the bottom washcoat; and c) coating a portion of the top washcoat layer which begins at an inlet axial end of the substrate with a platinum group metal solution for a length of 1.2 to 8 inch followed by drying at a temperature of about 100 to 140° C. and calcination to obtain a PGM gradient.

The step of preparing the slurry comprises a technique selected from incipient wetness impregnation, incipient wetness co-impregnation, and post-addition.

Incipient wetness impregnation techniques, also called capillary impregnation or dry impregnation are commonly used for the synthesis of heterogeneous materials, i.e., catalysts. Typically, an active metal precursor is dissolved in an aqueous or organic solution and then the metal-containing solution is added to a catalyst support containing the same pore volume as the volume of the solution that was added. Capillary action draws the solution into the pores of the support. Solution added in excess of the support pore volume causes the solution transport to change from a capillary action process to a diffusion process, which is much slower. The catalyst is dried and calcined to remove the volatile components within the solution, depositing the metal on the surface of the catalyst support. The concentration profile of the impregnated material depends on the mass transfer conditions within the pores during impregnation and drying. Multiple active metal precursors, after appropriate dilution, can be co-impregnated onto a catalyst support. Alternatively, an active metal precursor is introduced to a slurry via post-addition under agitation during the process of a slurry preparation.

The support particles are typically dry enough to absorb substantially all of the solution to form a moist solid. Aqueous solutions of water-soluble compounds or complexes of the active metal are typically utilized, such as rhodium chloride, rhodium nitrate, rhodium acetate, or combinations thereof where rhodium is the active metal and palladium nitrate, palladium tetra amine, palladium acetate, or combinations thereof where palladium is the active metal. Following treatment of the support particles with the active metal solution, the particles are dried, such as by heat treating the particles at elevated temperature (e.g., 100-150° C.) for a period of time (e.g., 1-3 hours), and then calcined to convert the active metal to a more catalytically active form. An exemplary calcination process involves heat treatment in air at a temperature of about 400-550° C. for 10 minutes to 3 hours. The above process can be repeated as needed to reach the desired level of loading of the active metal by means of impregnation.

The above-noted catalyst compositions are typically prepared in the form of catalyst particles as noted above. These catalyst particles are mixed with water to form a slurry for purposes of coating a catalyst substrate, such as a honeycomb-type substrate. In addition to the catalyst particles, the slurry may optionally contain a binder in the form of alumina, silica, zirconium acetate, colloidal zirconia, or zirconium hydroxide, associative thickeners, and/or surfactants (including anionic, cationic, non-ionic or amphoteric surfactants). Other exemplary binders include boehmite, gamma-alumina, or delta/theta alumina, as well as silica sol. When present, the binder is typically used in an amount of about 1.0-5.0 wt. % of the total washcoat loading. Addition of acidic or basic species to the slurry is carried out to adjust the pH accordingly. For example, in some embodiments, the pH of the slurry is adjusted by the addition of ammonium hydroxide, aqueous nitric acid, or acetic acid. A typical pH range for the slurry is about 3.0 to 12.

The slurry can be milled to reduce the particle size and enhance particle mixing. The milling is accomplished in a ball mill, continuous mill, or other similar equipment, and the solids content of the slurry may be, e.g., about 20-60 wt. %, more particularly about 20-40 wt. %. In one embodiment, the post-milling slurry is characterized by a D90 particle size of about 3.0 to about 40 microns, preferably 10 to about 30 microns, more preferably about 10 to about 15 microns. The D90 is determined using a dedicated particle size analyser. The equipment employed in this example uses laser diffraction to measure particle sizes in small volume slurry. The D90, typically with units of microns, means 90% of the particles by number have a diameter less than that value.

The slurry is coated on the catalyst substrate using any washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period (e.g., 10 minutes-3 hours) and then calcined by heating, e.g., at 400-700° C., typically for about 10 minutes to about 3 hours. Following drying and calcining, the final washcoat coating layer is viewed as essentially solvent-free. After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

In certain embodiments, the coated substrate is aged, by subjecting the coated substrate to heat treatment. In one embodiment, aging is done at a temperature of about 850° C. to about 1050° C. in an environment of 10 vol. % water in an alternating hydrocarbon/air feed for 50-75 hours. Aged catalyst articles are thus provided in certain embodiments. In certain embodiments, particularly effective materials comprise metal oxide-based supports (including, but not limited to substantially 100% ceria supports) that maintain a high percentage (e.g., about 95-100%) of their pore volumes upon aging (e.g., at about 850° C. to about 1050° C., 10 vol. % water in an alternating hydrocarbon/air feed, 50-75 hours aging).

In another aspect, there is provided an exhaust system for internal combustion engines, said system comprising the catalyst article according to the presently claimed invention.

In accordance with the presently claimed invention there is also provided a method of treating a gaseous exhaust stream comprising hydrocarbons, carbon monoxide, and nitrogen oxide, the method comprising contacting the exhaust stream with the catalyst article or the exhaust system according to the presently claimed invention.

In accordance with the presently claimed invention there is also provided a method of reducing hydrocarbons, carbon monoxide, and nitrogen oxide levels in a gaseous exhaust stream, the method comprising contacting the gaseous exhaust stream with the catalyst article or the exhaust system according to the presently claimed invention to reduce the levels of hydrocarbons, carbon monoxide, and nitrogen oxide in the exhaust gas.

In accordance with the presently claimed invention there is also provided use of the catalyst article according to the presently claimed invention for purifying a gaseous exhaust stream comprising hydrocarbons, carbon monoxide, and nitrogen oxide.

EXAMPLES

Aspects of the presently claimed invention are more fully illustrated by the following examples, which are set forth to illustrate certain aspects of the present invention and are not to be construed as limiting thereof.

Example 1 Preparation of CC1 Reference Catalyst A

Reference catalyst A is a Pd/Rh catalytic article with a PGM loading of 52 g/ft$^3$ (Pt/Pd/Rh=0/48/4). The catalyst A is a two-layer washcoat architecture coated onto a cylindrical monolith cordierite substrate having dimensions of 4.66" in diameter and 4.4" in length, a cell density of 900 cpsi, and a wall thickness of 2.5 mils.

Preparation of the bottom coat: 24 g/ft$^3$ of Pd (50 wt. % of the total Pd) in the form of palladium precursor solution was impregnated onto a refractory alumina, and 24 g/ft$^3$ of Pd (50 wt. % of the total Pd) in the form of palladium precursor solution was impregnated onto a stabilized ceria-zirconia composite with approximately 40 wt. % ceria. A slurry containing about 35.3 wt. % of the refractory Al$_2$O$_3$, 50.0 wt. % of the stabilized ceria-zirconia composite, barium acetate to yield 11.7 wt. % of BaO, zirconium acetate to yield 1.9 wt. % of ZrO$_2$, and 1.1 wt. % of Pd was coated onto the substrate. The washcoat loading of the bottom coat was about 2.59 g/in$^3$ after calcination at 550° C. for 1 hour in air.

Preparation of the top coat: 4 g/ft$^3$ of Rh (100 wt. % of the total Rh) in the form of rhodium precursor solution was impregnated onto a refractory alumina. A slurry mixture containing about 84.8 wt. % of the refractory Al$_2$O$_3$, 15.0 wt. % of a ceria-zirconia composite with approximately 50 wt. % ceria, and approximately 0.2 wt. % of Rh was coated over the bottom coat. The washcoat loading of the top coat was about 1.00 g/in$^3$ after calcination at 550° C. for 1 hour in air. The reference Pd/Rh catalytic article is illustrated in FIG. 1.

Example 2: Preparation of CC1 Reference Catalyst B

Reference catalyst B is a Pt/Pd/Rh catalytic article with a PGM loading of 49 g/ft$^3$ (Pt/Pd/Rh=0/48/1). The catalyst B is a two-layer washcoat architecture coated onto a cylindrical monolith cordierite substrate having dimensions of 4.66" in diameter and 4.4" in length, a cell density of 900 cpsi, and a wall thickness of 2.5 mils.

Preparation of the bottom coat: The bottom coat is identical to that of the reference catalyst A.

Preparation of the top coat: 1 g/ft$^3$ of Rh (100 wt. % of the total Rh) in the form of rhodium precursor solution were impregnated onto a refractory alumina. A slurry mixture containing about 84.9 wt. % of the refractory Al$_2$O$_3$, 15.0 wt. % of a ceria-zirconia composite with approximately 50 wt. % ceria, approximately 0.1 wt. % of Rh was coated over the bottom coat. The washcoat loading of the top coat was about 1.00 g/in$^3$ after calcination at 550° C. for 1 hour in air. Catalyst B is illustrated in FIG. 1.

Example 3: Preparation of CC1 Invention Catalyst C

Invention Catalyst C is a Pt/Pd/Rh catalytic article with a PGM loading of 52 g/ft$^3$ (Pt/Pd/Rh=0/48/4). The catalyst C is a two-layer washcoat architecture coated onto a cylindrical monolith cordierite substrate having dimensions of 4.66" in diameter and 4.4" in length, a cell density of 900 cpsi, and a wall thickness of 2.5 mils.

Preparation of the bottom coat: The bottom coat is identical to that of the reference catalyst A.

Preparation of the top coat: The top coat is identical to that of the reference catalyst B.

Preparation of Rh-gradient within the top coat: 3.77 g/ft$^3$ Rh (75% of the total Rh in the sample) were allowed to absorb such as to cover ~80% of the substrate length as a Rh precursor solution from one, in this case inlet, end of the substrate already containing the bottom and top coats. Thus, a Rh gradient was formed with the top coat of the catalyst. In a subsequent step, the substrate was dried at 120° C. for 30 minutes and calcined at 550° C. for 1 hour in air. The resulting Rh enrichment area exhibits a Rh gradient with decreasing Rh concentration moving from the top of the top coat towards the bottom of the top coat. The gradient is set such that at least 50% Rh in the gradient containing portion of the top coat is located in the top %-portion of the top coat. Catalyst C is illustrated in FIG. 1.

Example 4: Preparation of CC1 Invention Catalyst D

Invention Catalyst D is a Pt/Pd/Rh catalytic article with a PGM loading of 52 g/ft$^3$ (Pt/Pd/Rh=0/48/4). The catalyst D is a two-layer washcoat architecture coated onto a cylindrical monolith cordierite substrate having dimensions of 4.66" in diameter and 4.4" in length, a cell density of 900 cpsi, and a wall thickness of 2.5 mils.

Preparation of the bottom coat: The bottom coat is identical to that of the reference catalyst A.

Preparation of the top coat: The top coat is identical to that of the reference catalyst B.

Preparation of Rh-gradient within the top coat: 11 g/ft$^3$ Rh (75% of the total Rh in the sample) were allowed to absorb such as to cover ~27% of the substrate length as a Rh precursor solution from the first axial end of the substrate already containing the bottom and top coats. Thus, a Rh gradient was formed with the top coat of the catalyst. In a subsequent step, the substrate was dried at 120° C. for 30 minutes and calcined at 550° C. for 1 hour in air. The resulting Rh enrichment area exhibits a Rh gradient with decreasing Rh concentration moving from the top of the top coat towards the bottom of the top coat. The gradient is set such that at least 50% Rh in the gradient containing portion of the top coat is located in the top %-portion of the top coat. Catalyst D is illustrated in FIG. 1.

Example 5: Preparation of CC1 Invention Catalyst E

Invention Catalyst E is a Pt/Pd/Rh catalytic article with a PGM loading of 52 g/ft$^3$ (Pt/Pd/Rh=0/48/4). The catalyst E is a two-layer washcoat architecture coated onto a cylindrical monolith cordierite substrate having dimensions of 4.66" in diameter and 4.4" in length, a cell density of 900 cpsi, and a wall thickness of 2.5 mils.

Preparation of the bottom coat: The bottom coat is identical to that of the reference catalyst A.

Preparation of the top coat: The top coat is identical to that of the reference catalyst B.

Preparation of Rh-gradient within the top coat: 7.33 g/ft$^3$ Rh (75% of the total Rh in the sample) were allowed to absorb such as to cover ~41% of the substrate length as a Rh precursor solution from the first axial end of the substrate already containing the bottom and top coats. Thus, a Rh gradient was formed with the top coat of the catalyst. In a subsequent step, the substrate was dried at 120° C. for 30 minutes and calcined at 550° C. for 1 hour in air. The resulting Rh enrichment area exhibits a Rh gradient with decreasing Rh concentration moving from the top of the top coat towards the bottom of the top coat. The gradient is set such that at least 50% Rh in the gradient containing portion of the top coat is located in the top %-portion of the top coat. Catalyst E is illustrated in FIG. 1.

Example 6: Preparation of UF Reference Catalyst F

Reference Catalyst F is a Pd/Rh catalytic article with a PGM loading of 30 g/ft³ (Pt/Pd/Rh=0/25/5). The catalyst F is a single-layer washcoat architecture coated onto a cylindrical monolith cordierite substrate having dimensions of 4.16" in diameter and 4.53" in length, a cell density of 400 cpsi, and a wall thickness of 4 mils.

Preparation of the coat: 5 g/ft³ of Rh (100 wt. % of the total Rh) in the form of rhodium precursor solution was impregnated onto a refractory alumina, and 25 g/ft³ of Pd (100 wt. % of the total Pd) in the form of palladium precursor solution was impregnated onto a stabilized ceria-zirconia composite with approximately 30 wt. % ceria. A slurry containing about 28.3 wt. % of the refractory $Al_2O_3$, 63.8 wt. % of the stabilized ceria-zirconia composite, barium acetate to yield 4.5 wt. % of BaO, zirconium acetate to yield 2.9 wt. % of $ZrO_2$, 0.1 wt. % Rh and 0.4 wt. % of Pd was coated onto the substrate. The washcoat loading of the bottom coat was about 3.53 g/in³ after calcination at 550° C. for 1 hour in air.

Example 7: Testing of Catalysts

Figure 2:
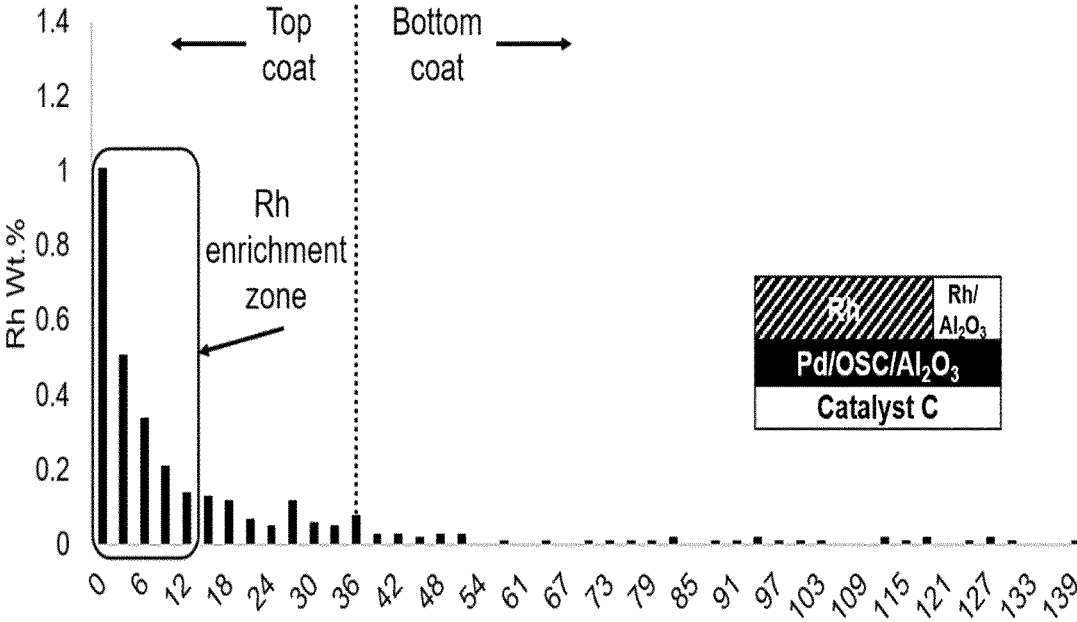
FIG. 2 illustrates Rh gradient in the top coat of an example invention catalyst.
Figure 3A:
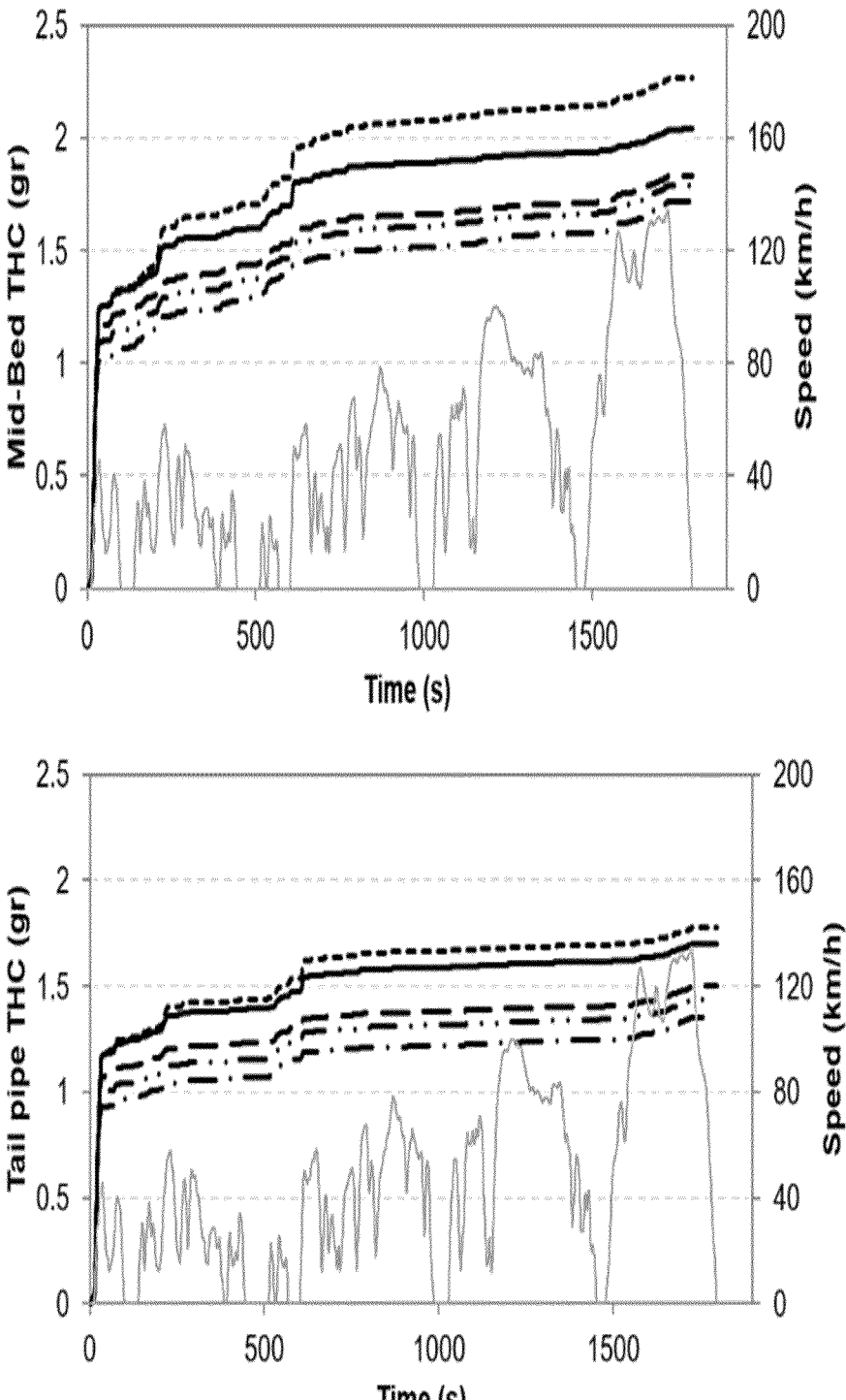
FIGS. 3A, 3B and 3C contain graphs showing comparative test results for cumulative THC emission, CO emission, and NO$_x$ emission respectively of various catalytic article materials in mid-bed and tail pipe.
Figure 3B:
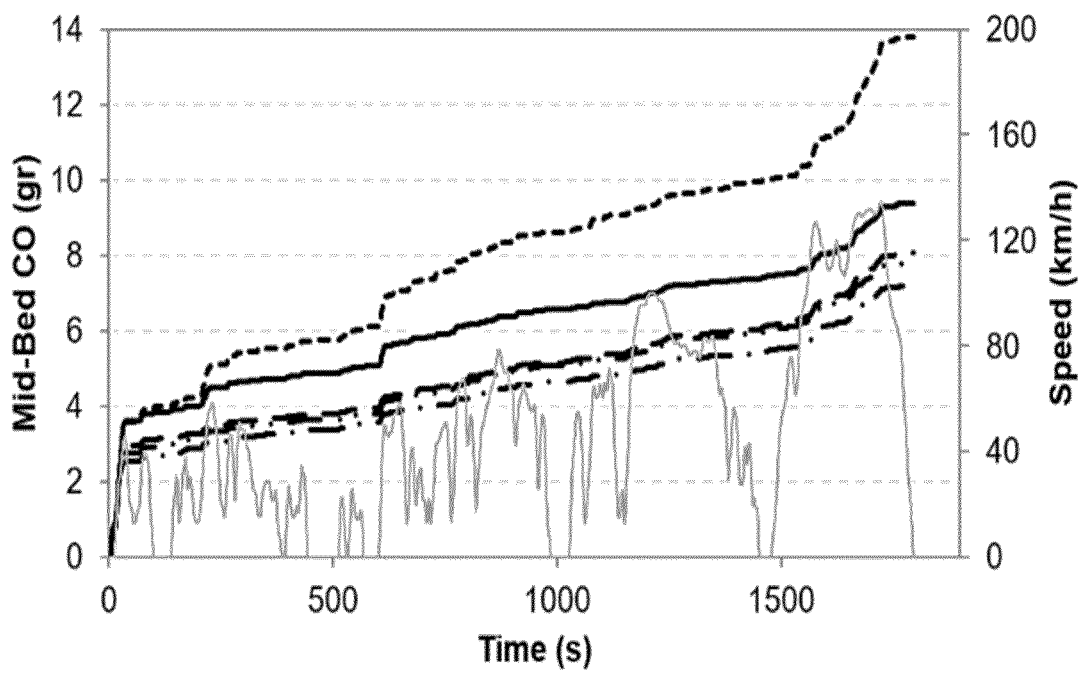
Figure 3B:
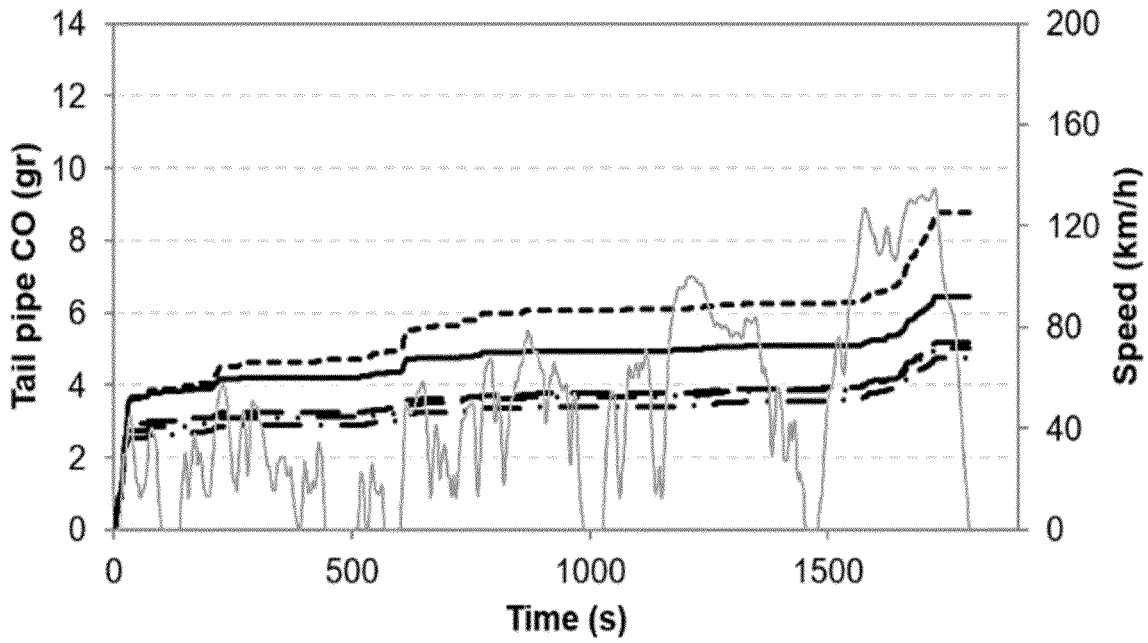
Figure 3C:
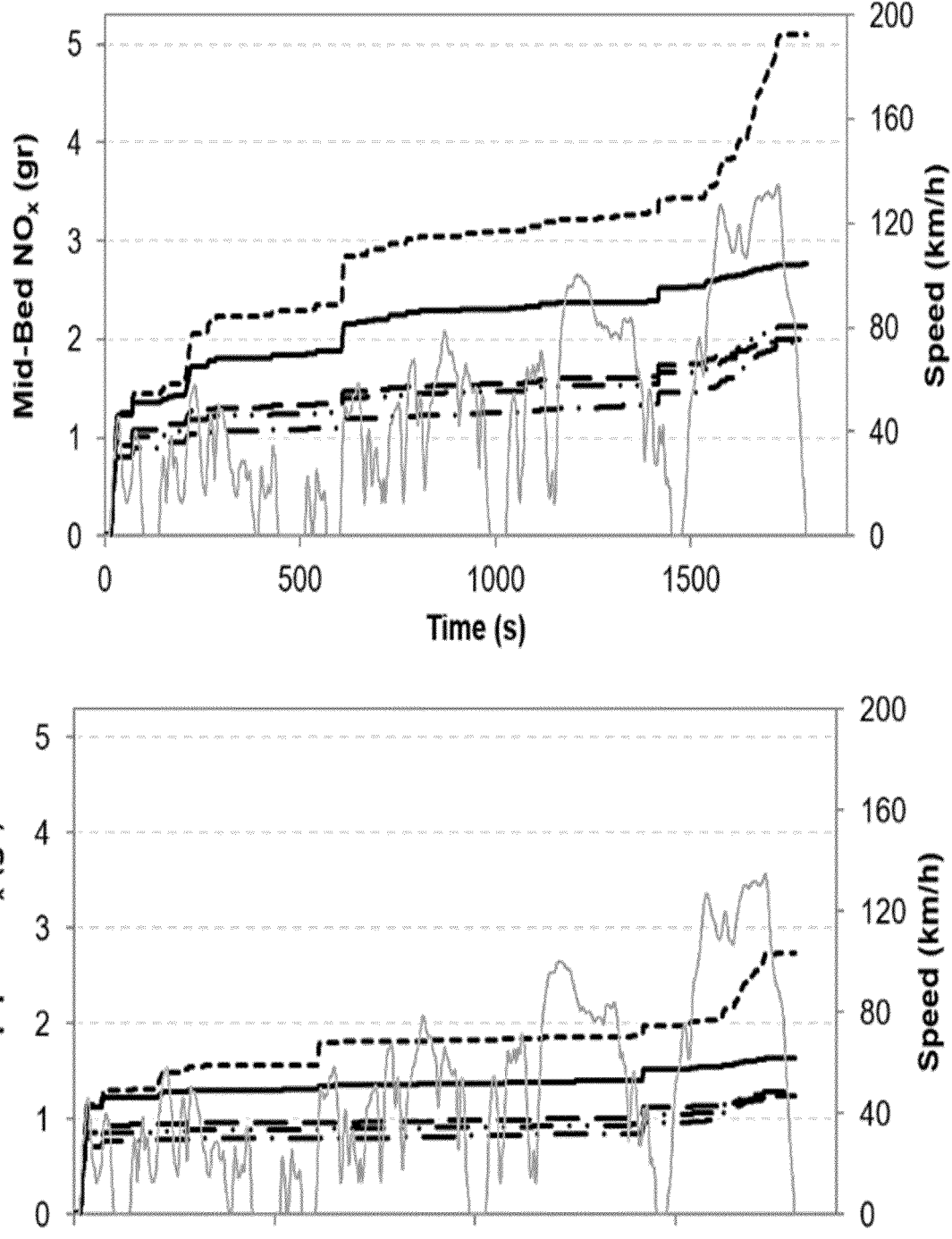

All catalysts prepared in examples 1 to 6 are schematically shown in FIG. 1. The PGM gradient concept is explained in greater detail in FIG. 2 using Invention Catalyst D as an example. In FIG. 2 rhodium wt. % is provided in Y-axis and the washcoat depth counting from the uppermost portion of the top coat towards the substrate wall (μm) is provided in X-axis.

All catalysts were aged using an fuel-cut aging protocol using an engine setup to operate such that the typical inlet temperature is ~950° C. and the typical catalyst bed temperature does not exceed ~1030° C. The engine-out gas feed composition alternates between rich and lean to simulate typical operating conditions for a vehicle tested under the WLTC test protocol. All CC1 catalysts were aged using the same conditions for 100 hours. Catalyst F was used as a common underfloor catalyst and was aged using the same protocol but in the UF position, which resulted in proportionally lower effective temperatures, for 100 h.

The emission performance was tested using a 2.0 L turbocharged engine with a CC+UF emissions control system configuration operating under the WLTC test protocol. Each system was tested at least four times to assure high experiment repeatability and data consistency.

The benefit of using the Rh gradient in the catalyst, for example in the top coat, is demonstrated in FIG. 3 (3A, 3B & 3C). The invention catalysts achieve ~12% THC, ~18% CO and ~25% $NO_x$ improvement in the mid-bed in the WLTC test compared to the reference at the same (0/48/4) PGM loading without a change in the washcoat support formulation. The improvement is attributed to the architecture based on the PGM gradient since the underlying washcoat is identical to that of the 0/48/1 reference Catalyst B and the impact of Rh increase in the washcoat is exemplified by the difference between Catalyst A and Catalyst B, both identical except for the Rh concentration in the top coat with uniform (essentially Rh gradient-free) top coat.

Reference throughout this specification to "one embodiment," "certain embodiments," "one or more embodiments" or "an embodiment" means that a particular feature, structure, material, or characteristic described in connection with the embodiment is included in at least one embodiment of the presently claimed invention. Thus, the appearances of the phrases such as "in one or more embodiments," "in certain embodiments," "in some embodiments," "in one embodiment," or "in an embodiment" in various places throughout this specification are not necessarily referring to the same embodiment of the presently claimed invention. Furthermore, the particular features, structures, materials, or characteristics may be combined in any suitable manner in one or more embodiments. All of the various embodiments, aspects, and options disclosed herein can be combined in all variations, regardless of whether such features or elements are expressly combined in a specific embodiment description herein. This presently claimed invention is intended to be read holistically such that any separable features or elements of the disclosed invention, in any of its various aspects and embodiments, should be viewed as intended to be combinable unless the context clearly dictates otherwise.

Although the embodiments disclosed herein have been described with reference to particular embodiments it is to be understood that these embodiments are merely illustrative of the principles and applications of the presently claimed invention. It will be apparent to those skilled in the art that various modifications and variations can be made to the methods and apparatus of the presently claimed invention without departing from the spirit and scope of the presently claimed invention. Thus, it is intended that the presently claimed invention include modifications and variations that are within the scope of the appended claims and their equivalents, and the above-described embodiments are presented for purposes of illustration and not of limitation. All patents and publications cited herein are incorporated by reference herein for the specific teachings thereof as noted, unless other statements of incorporation are specifically provided.

What is claimed is:

1. An emission control catalyst article comprising:

a substrate having a first inlet axial end and a second outlet axial end, a bottom washcoat layer comprising a platinum group metal coated on 60% to 100% length of the substrate from the first axial end to the second axial end, and a top washcoat layer comprising a platinum group metal (PGM) coated on 60% to 100% length of the substrate from either the first axial or the second axial end of the substrate, wherein the top washcoat covers at least 60% of the length of the bottom washcoat layer, wherein at least a portion of the top washcoat layer, the bottom washcoat layer or both washcoat layers comprises a platinum group metal deposited within the washcoat layer(s) with a platinum group metal gradient, wherein the PGM concentration in a top-most portion of the washcoat layer is at least two times higher compared to the PGM concentration in a bottom-most portion of the washcoat layer, and wherein a length of the portion of the top washcoat layer, the bottom washcoat layer or both washcoat layers ranges from 20%-100% of the substrate length; and wherein the platinum group metal gradient is formed by enriching a portion of the top washcoat layer, the bottom washcoat layer, or both the top washcoat layer and the bottom washcoat layer, which is pre-loaded with platinum group metal, with an additional platinum group metal or a combination thereof.

2. The emission control catalyst article according to claim 1, wherein a length of the platinum group metal gradient ranges from 1.2 inch to 8 inch.

3. An emission control catalyst article comprising:
a substrate having a first inlet axial end and a second outlet axial end,
a bottom washcoat layer comprising a platinum group metal coated on 60% to 100% length of the substrate from the first axial end to the second axial end, and
a top washcoat layer comprising a platinum group metal coated on 60% to 100% length of the substrate from either the first axial or the second axial end of the substrate, wherein the top coat covers at least 60% of the length of the bottom washcoat layer,
wherein at least a portion of the top washcoat layer comprises rhodium or a mixture of rhodium and platinum group metal(s) deposited within the washcoat layer(s) with a rhodium gradient, wherein the rhodium concentration in a top-most portion of the washcoat layer is at least two times higher compared to the rhodium concentration in a bottom-most portion of the washcoat layer,
wherein a length of the portion of the top washcoat layer, the bottom washcoat layer or both washcoat layers ranges from 20%-100% of the substrate length,
wherein the total platinum group metal loading deposited with a gradient is 30% to 95% of the total platinum group metal loading present in the washcoat layer, and
wherein the top washcoat layer comprises uniformly deposited rhodium, a ratio of a total amount of the uniformly deposited rhodium within the top washcoat compared to an amount of the rhodium deposited by gradient ranges from 10:1 and 1:10.

4. The emission control catalyst article according to claim 1, wherein the total platinum group metal loading deposited with a gradient is 30% to 95% of the total platinum group metal loading present in the washcoat layer, wherein the ratio of the total amount of platinum group metal deposited uniformly within a washcoat compared to the platinum group metal amount deposited by gradient ranges from 10:1 and 1:10.

5. The catalyst article according to claim 1, wherein the platinum group metal is selected from platinum, palladium, rhodium, and a combination thereof.

6. The catalyst article according to claim 1, wherein the platinum group metal is supported on a support selected from oxygen storage component, alumina component, ceria component, zirconia component, and a combination thereof.

7. The catalyst article according to claim 3, wherein at least 60% of rhodium is deposited with a gradient, covers at least 50% of the substrate length, and the rhodium concentration is two times higher in an uppermost portion of the washcoat layer compared to a lowermost portion of the washcoat layer.

8. The catalyst article according to claim 1, wherein 50% or more of the platinum group metal within the top washcoat layer or bottom washcoat layer is deposited in an uppermost one third of the washcoat layer, as determined by an electron-probe microanalysis (EPMA) line scan from the uppermost layer of the washcoat layer containing the platinum group metal gradient to the substrate.

9. The catalyst article according to claim 1, wherein 55% to 95% of the platinum group metal within the top washcoat layer or bottom washcoat layer is deposited in the uppermost one third of the washcoat layer, as determined by an electron-probe microanalysis (EPMA) line scan from the uppermost layer of the washcoat layer containing the platinum group metal gradient to the substrate.

10. The catalyst article according to claim 1, wherein the platinum group metal gradient comprises palladium.

11. The catalyst article according to claim 1, wherein the platinum group metal gradient comprises platinum.

12. The catalyst article according to claim 1, wherein the platinum group metal gradient comprises rhodium.

13. The catalyst article according to claim 6, wherein the alumina component comprises alumina, lanthana-alumina, ceria-alumina, ceria-zirconia-alumina, zirconia-alumina, lanthana-zirconia-alumina, baria-alumina, baria-lanthana-alumina, baria-lanthana-neodymia-alumina, or combinations thereof, the oxygen storage component comprises ceria-zirconia, ceria-zirconia-lanthana, ceria-zirconia-yttria, ceria-zirconia-lanthana-yttria, ceria-zirconia-neodymia, ceria-zirconia-praseodymia, ceria-zirconia-lanthana-neodymia, ceria-zirconia-lanthana-praseodymia, ceria-zirconia-lanthana-neodymia-praseodymia, or any combination thereof, and the zirconia component comprises lanthana-zirconia, and barium-zirconia.

14. The catalyst article according to claim 1, wherein the bottom washcoat layer comprises at least one alkaline earth metal oxide comprising barium oxide, strontium oxide, or any combination thereof, in an amount of 1.0 wt. % to 20 wt. %, based on the total weight of the bottom washcoat.

15. The catalyst article according to claim 1, wherein the substrate is a ceramic substrate, metal substrate, ceramic foam substrate, polymer foam substrate, or a woven fibre substrate.

16. An exhaust system for internal combustion engines, the system comprising the catalyst article according to claim 1.

17. A method of treating a gaseous exhaust stream comprising hydrocarbons, carbon monoxide, and nitrogen oxide, the method comprising contacting the exhaust stream with the catalyst article according claim 1.

18. A method of reducing hydrocarbons, carbon monoxide, and nitrogen oxide levels in a gaseous exhaust stream, the method comprising contacting the gaseous exhaust stream with the catalyst article according to claim 1 to reduce the levels of hydrocarbons, carbon monoxide, and nitrogen oxide in the exhaust gas.

19. An emission control catalyst article comprising:
a substrate having a first inlet axial end and a second outlet axial end,
a bottom washcoat layer comprising a platinum group metal coated on 60% to 100% length of the substrate from the first axial end to the second axial end, and
a top washcoat layer comprising a platinum group metal (PGM) coated on 60% to 100% length of the substrate from either the first axial or the second axial end of the substrate, wherein the top washcoat covers at least 60% of the length of the bottom washcoat layer,
wherein at least a portion of the top washcoat layer, the bottom washcoat layer or both washcoat layers comprises a platinum group metal deposited within the washcoat layer(s) with a platinum group metal gradient, wherein the PGM concentration in a top-most portion of the washcoat layer is at least two times higher compared to the PGM concentration in a bottom-most portion of the washcoat layer, and
wherein a length of the portion of the top washcoat layer, the bottom washcoat layer or both washcoat layers ranges from 20%-100% of the substrate length; and wherein the platinum group metal gradient is formed by enriching a portion of the top washcoat layer, the bottom washcoat layer, or both the top washcoat layer and the bottom washcoat layer, which is essentially free of any platinum group metal, with a platinum group metal or a combination thereof.

* * * * *